United States Patent
McElvain et al.

(10) Patent No.: US 11,074,677 B2
(45) Date of Patent: Jul. 27, 2021

(54) DYNAMIC RANGE EXTENSION OF PARTIALLY CLIPPED PIXELS IN CAPTURED IMAGES

(71) Applicant: Dolby Laboratories Licensing Corporation, San Francisco, CA (US)

(72) Inventors: Jon S. McElvain, Manhattan Beach, CA (US); Robin Atkins, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 85 days.

(21) Appl. No.: 16/353,399

(22) Filed: Mar. 14, 2019

(65) Prior Publication Data

US 2019/0304073 A1  Oct. 3, 2019

Related U.S. Application Data

(60) Provisional application No. 62/649,761, filed on Mar. 29, 2018.

(30) Foreign Application Priority Data

Mar. 29, 2018  (EP) ..................... 18164973

(51) Int. Cl.
*G06T 5/20* (2006.01)
*G06T 5/00* (2006.01)

(52) U.S. Cl.
CPC ............... *G06T 5/20* (2013.01); *G06T 5/008* (2013.01); *G06T 2207/20036* (2013.01); *G06T 2207/20208* (2013.01)

(58) Field of Classification Search
CPC . G06T 5/20; G06T 5/008; G06T 2207/20036; G06T 2207/20208
See application file for complete search history.

(56) References Cited

U.S. PATENT DOCUMENTS

| | | | |
|---|---|---|---|
| 7,327,504 | B2 | 2/2008 | Gallagher |
| 8,248,481 | B2 | 8/2012 | Savidge |
| 8,761,504 | B2 | 6/2014 | Hirakawa |
| 8,861,851 | B2 | 10/2014 | Heidrich |
| 9,055,178 | B2 | 6/2015 | Hirakawa |
| 9,066,001 | B2 | 6/2015 | Hokoi |
| 9,343,041 | B2 | 5/2016 | Miller |
| 9,749,534 | B2 | 8/2017 | Martinello |

(Continued)

FOREIGN PATENT DOCUMENTS

WO   2017/167700   10/2017

OTHER PUBLICATIONS

Masood et al. "Automatic Correction of Saturated Regions in Photographs using Cross-Channel Correction", Computer Graphics Forum, vol. 28, Issue 7, pp. 1861-1869 (Year: 2009).*

(Continued)

*Primary Examiner* — Qian Yang

(57) ABSTRACT

Methods for recovering saturated pixel values in raw pixel data are described. Given an image with raw pixel values captured using sensors with a color filter array (CFA), image regions are classified according to how many color channels of the CFA are saturated. Values of saturated pixels are estimated based on weighted color ratios of unsaturated pixels and recovered pixels. Example methods for a Bayer CFA are provided.

8 Claims, 7 Drawing Sheets

(56) References Cited

U.S. PATENT DOCUMENTS

| | | |
|---|---|---|
| 9,754,349 B2 | 9/2017 | Douady-Pleven |
| 2003/0222991 A1 | 12/2003 | Muammar |
| 2006/0204128 A1* | 9/2006 | Silverstein .............. G06T 5/008 |
| | | 382/275 |
| 2012/0288192 A1 | 11/2012 | Heidrich |
| 2015/0256760 A1 | 9/2015 | Ju |
| 2016/0352975 A1 | 12/2016 | Kervec |

OTHER PUBLICATIONS

Masood, S. et al "Automatic Correction of Saturated Regions in Photographs using Cross-Channel Correlation" Pacific Graphics, vol. 28, No. 7, Oct. 2009, pp. 1861-1869.

Rouf, M. et al "Gradient Domain Color Restoration of Clipped Highlights" IEEE Explore, 2012, pp. 1-8.

Soriano, M. et al "Making Saturated Facial Images Useful Again" Visual Communications and Image Processing, vol. 3826, Jun. 17, 1999, pp. 113-121.

Abebe, M. A. "Towards an Automatic Correction of Over-Exposure in Photographs: Application to Tone-Mapping" Computer Vision and Image Understanding, vol. 168, Mar. 1, 2018, pp. 3-20.

Elboher, E. et al "Recovering Color and Details of Clipped Image Regions" IADIS International Conference on Computer Graphics, Visualization, Computer Vision and Image Processing, Jul. 1, 2010, pp. 124-132.

\* cited by examiner

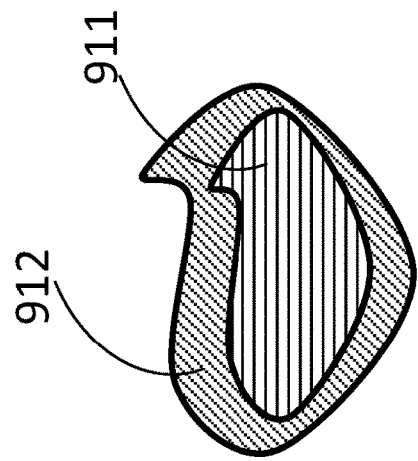
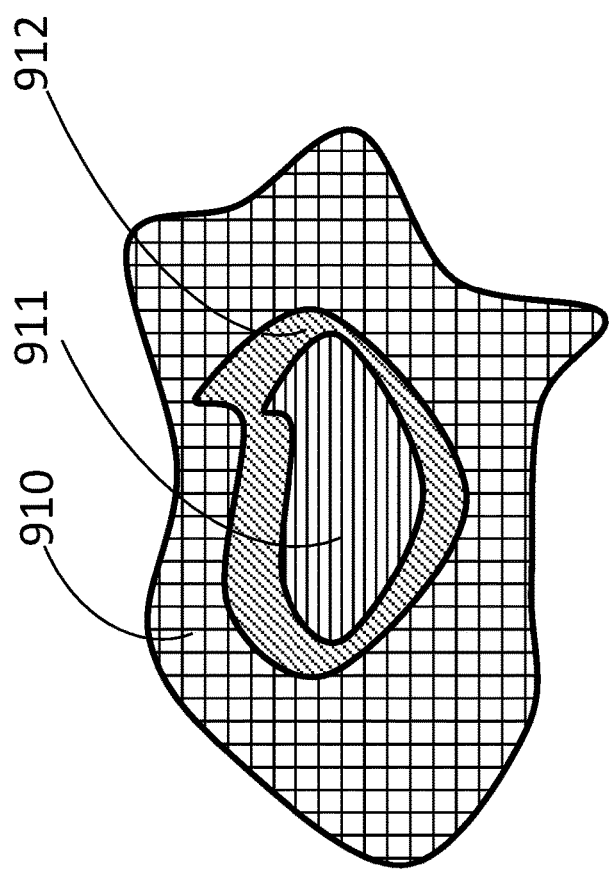
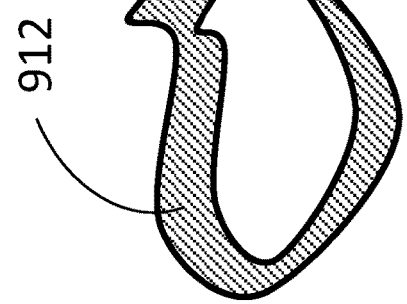
Fig. 6B
Fig. 6C
Fig. 6A

DYNAMIC RANGE EXTENSION OF PARTIALLY CLIPPED PIXELS IN CAPTURED IMAGES

CROSS REFERENCE TO RELATED APPLICATIONS

This application claims priority to U.S. Provisional Application No. 62/649,761, filed Mar. 29, 2018, and European Patent Application No. 18164973.2, filed Mar. 29, 2018, each of which is incorporated by reference in its entirety.

TECHNICAL FIELD

The present disclosure is related to image reconstruction, and more particularly to methods and apparatus for improving the dynamic range of saturated pixels in captured images.

BACKGROUND

For many real scenes, the dynamic range can be quite large. For example, for a typical daylight scene with shadows present, the dynamic range can be well over 1,000,000:1. The capture of these scenes presents a formidable challenge to camera systems, as the sensor and camera optics may have a significantly reduced dynamic range capture capability. These limitations are imposed due to a variety of factors, including finite sensor full-well capacities, fundamental noise generation in the sensor, as well as flare/glare introduced by the optical lens stack. Neglecting the optics, the dynamic range (D) of the sensor has an upper limit given by:

$$D_{max} = s_{max}/s_{noise}$$

where $s_{max}$ and $s_{noise}$ refer to the sensor signal maximum and noise floor, respectively. For many mobile sensors, this dynamic range is limited to approximately 500:1, and thus the auto-exposure algorithms need be highly optimized to capture the salient features in the scene. Nevertheless, some image features will inevitably be clipped by this process, and this generally results in a loss of information in these areas (both in the shadows and highlights). Any scene with dynamic range exceeding this 500:1 ratio will require some compromise to either bright or dark (or both) regions of the image.

The use of Red, Green, Blue (RGB) color filter arrays (CFA) is ubiquitous for mobile and Digital single-lens reflex (DSLR) sensors alike, where color scene information is gained at the expense of spatial resolution (the Bayer pattern is the most common CFA mosaic configuration). The spectral sensitivity of a given pixel is determined by the combination of the spectral transmittance of the color filter above it and the native silicon spectral absorption, plus the spectral transmittance of the optical stack. FIG. 1 shows an exemplary spectral sensitivity plot for a typical mobile camera (e.g. a Google Pixel™ 2 XL).

The R,G,B electronic signal generated in the sensor is determined by integrating these spectral response characteristics with the spectral radiance at the photo-site; for a spectrally flat light field, this reduces to computing the area under each of these curves. Thus, for a "white" object, the native green channel response (from a typical CMOS sensor) will generally be much greater than the corresponding signals for red and blue. In a post-processing step, an additional gain is applied to the R and B channels, such that white objects appear as intended in the final image—this is known as "white balancing".

Depending on the scene composition and the exposure configuration chosen, a scenario often arises where the green channel will reach saturation (sensor pixel full-well capacity reached) before the other two channels. Application of a global white balance to the R,G,B channels will result in an undesirable color cast, and objects in the scene that were originally white will take on a strong magenta cast.

In image processing pipelines that follow the acquisition process, a common technique used to eliminate the magenta cast in these regions is to restrict the R and B channel digital values, such that:

$$R \leq \frac{w_G}{w_R} G_{sat}, \text{ and } B \leq \frac{w_G}{w_B} G_{sat},$$

where ($w_R$, $w_G$, $w_B$) are the white balance values for the R, G, and B channels respectively, and $G_{sat}$ is the saturation value for the G channel. A major issue with such an approach of restricting the R and B channels as described above is the loss of information in the R and B channels.

Due to the fundamentally strong correlation between the R, G, B channels in a typical captured image, it is possible to use the (R, B) information that would be discarded in a traditional image processing pipeline to estimate the true relative radiance of the G channel. In a typical scenario wherein the G channel is saturated but R and B channels are not, such "extra" information would be in the following range:

$$\frac{w_G}{w_R} G_{sat} < R \leq R_{sat}, \text{ and } \frac{w_G}{w_B} G_{sat} < B \leq B_{sat}.$$

Estimation of the G channel at location (x,y) would be cast in the form:

$$G_{est}(x,y) = \alpha(x,y)R(x,y) + \gamma(x,y)B(x,y),$$

or for a well-exposed R channel this can be simplified, $$G_{est}(x,y) = \alpha(x,y)R(x,y), \quad (1)$$

where $\alpha(x,y)$ and $\gamma(x,y)$ denote modeling parameters. So the problem in this case reduces to accurate estimation of the coefficient $\alpha(x,y)$ based on information gathered from the image. Fundamentally, this is equivalent to extrapolating the saturated pixels from corresponding or nearby non-saturated pixels. This is a much more challenging problem than the usual interpolation used to calculate missing values from the mosaic pattern. Extrapolation in general is under-determined and has an infinite number of possible solutions. Our challenge is to combine prior knowledge with image analysis to estimate a reasonable solution that results in a plausible image.

There have been several approaches to solving this problem in the literature. One example is the method developed by Hirakawa (U.S. Pat. No. 9,055,178 B2), which considers low pass and high pass components of the image and reconstructs each in a different manner. In this approach, there is a built-in bias that forces many estimated highlights to become more neutral in color. Because there are iterations that involve convolution filters (e.g. separation of high pass and low pass components), some contour artifacts do result from this approach.

There are also numerous image manipulation software products that feature this capability (Photoshop, Lightroom, Photo Ninja), and this function is typically called "highlight recovery," although, these are mostly intended to operate on still images rather than sequences.

In view of the above, capturing scenes with large dynamic range is a challenging task. There is a need for methods and devices to accurately estimate clipped pixels for still images and video sequences. One approach to reconstruct clipped pixels is to use the available information from unsaturated pixels throughout the capture.

SUMMARY

Reiterating what was described above, reconstruction of captured images with saturated pixels is highly desired and needed for still images and video sequences. As a result of such reconstruction, the dynamic range of clipped pixels may drastically improve. Methods and devices taught in the present disclosure address such need.

According to a first aspect of the present disclosure, an image reconstruction method is disclosed, providing: (a) providing raw pixel data from an image captured using a color filter array or separate color sensors, wherein the image has a first region comprising first region pixels, and wherein colors of the first region pixels have a first color channel being saturated; (b) choosing a first pixel parameter, a second pixel parameter, and a third pixel parameter wherein: the first pixel parameter represents a first pixel property of image pixels; the second pixel parameter represents a second pixel property of the image pixels; and the third pixel parameter represents a third pixel property of the image pixels; (c) dividing unsaturated pixels of the image into a plurality of color clusters based on the first pixel parameters and the second pixel parameters of the unsaturated pixels; (d) for at least one color cluster of the plurality of color clusters: (d1) providing a first cluster parameter based on the first pixel parameters of the pixels of the color cluster; (d2) providing a second cluster parameter based on the second pixel parameters of the pixels of the color cluster; and (d3) providing a third cluster parameter based on the third pixel parameters of the pixels of the color cluster; (e) for one or more pixels of the first region: (e1) in correspondence with a color cluster of the plurality of color clusters: providing a first weighting coefficient based on the second and the third pixel parameters of the one or more pixels of the first region and the second and the third cluster parameters of the color cluster of the plurality of color clusters; (e2) obtaining a weighted sum of the first cluster parameters using the first weighting coefficients; (e3) obtaining a first color channel estimate of the one or more pixels of the first region using a combination of the weighted sum of the first cluster parameters and color information associated with at least one unsaturated color channel of the one or more pixels of the first region.

In some embodiments, the first and second pixel parameters may be different from each other. They may relate to color or luminance properties of pixels. Likewise, the third pixel parameter may be different from the first and second pixel parameters. It may relate to color or luminance properties of pixels or to (physical) pixel locations of pixels (e.g., physical distances between pairs of pixels). In some embodiments, the first pixel parameter may be a first ratio of color channel values and the second pixel parameters may be a second ratio of color channel values that is different from the first ratio. For example, the first pixel parameter may be a ratio of a saturated color channel value (value of the saturated color channel) and an unsaturated color channel value (value of an unsaturated color channel). Further, the second pixel parameter may be a ratio of unsaturated color channel values. Likewise, the third pixel parameter may be a third ratio of color channel values or of a luminance value and a color channel value, or may be related to a spatial pixel location. The third ratio may be different from the first and second ratios.

According to a second aspect of the present disclosure, an image reconstruction method is disclosed, providing: (a) providing raw pixel data from an image captured using a color filter array, wherein the image has a saturated region comprising saturated region pixels, and wherein colors of the saturated region pixels have a saturated color channel; (b) identifying a boundary region using one of equations A) $m_1$=[dilate(m)−m)] AND n, or B) $m_1$=dilate(m) AND n, wherein: m is a first mask corresponding to pixels of the first region; n is second mask corresponding to non-saturated pixels in the image; $m_1$ is a third mask corresponding to the boundary region; and dilate( ) is a morphological dilating function. (c) for one or more pixels of the boundary region, providing a first ratio between the saturated color channel of the one or more pixels of the boundary region and a non-saturated color channels of the image; (d) for one or more pixels of the saturated region, replacing the saturated color channel with a value obtained by multiplying one or more of the non-saturated color channels with a second ratio wherein, the second ratio is one of: (d1) an average of all the first ratios; or (d2) an average of ratios of two non-saturated color channels. In other words, an estimate of the saturated color channel is obtained by multiplying the one or more of the non-saturated color channels with the second ratio. The saturated color channel may then be replaced by the estimate for the saturated color channel.

DESCRIPTION OF THE DRAWINGS

FIGS. 6A-6C show the process of defining the type I/II boundary region.

DETAILED DESCRIPTION

The term "type I" saturated pixels is referred herewith to pixels of a captured image where only a single channel is saturated (e.g. a G channel is saturated, but not the R and B channels). The term "type II" saturated pixels is referred herewith to pixels of a captured image where two channels are saturated (e.g. G and B channels are saturated, but the R channel is not). The term "type III" saturated pixels is referred herewith to pixels of a captured image where three channels (e.g. R, G and B) are saturated. The terms "saturated pixels" and "clipped pixels" are used interchangeably throughout this disclosure.

Figure 1:
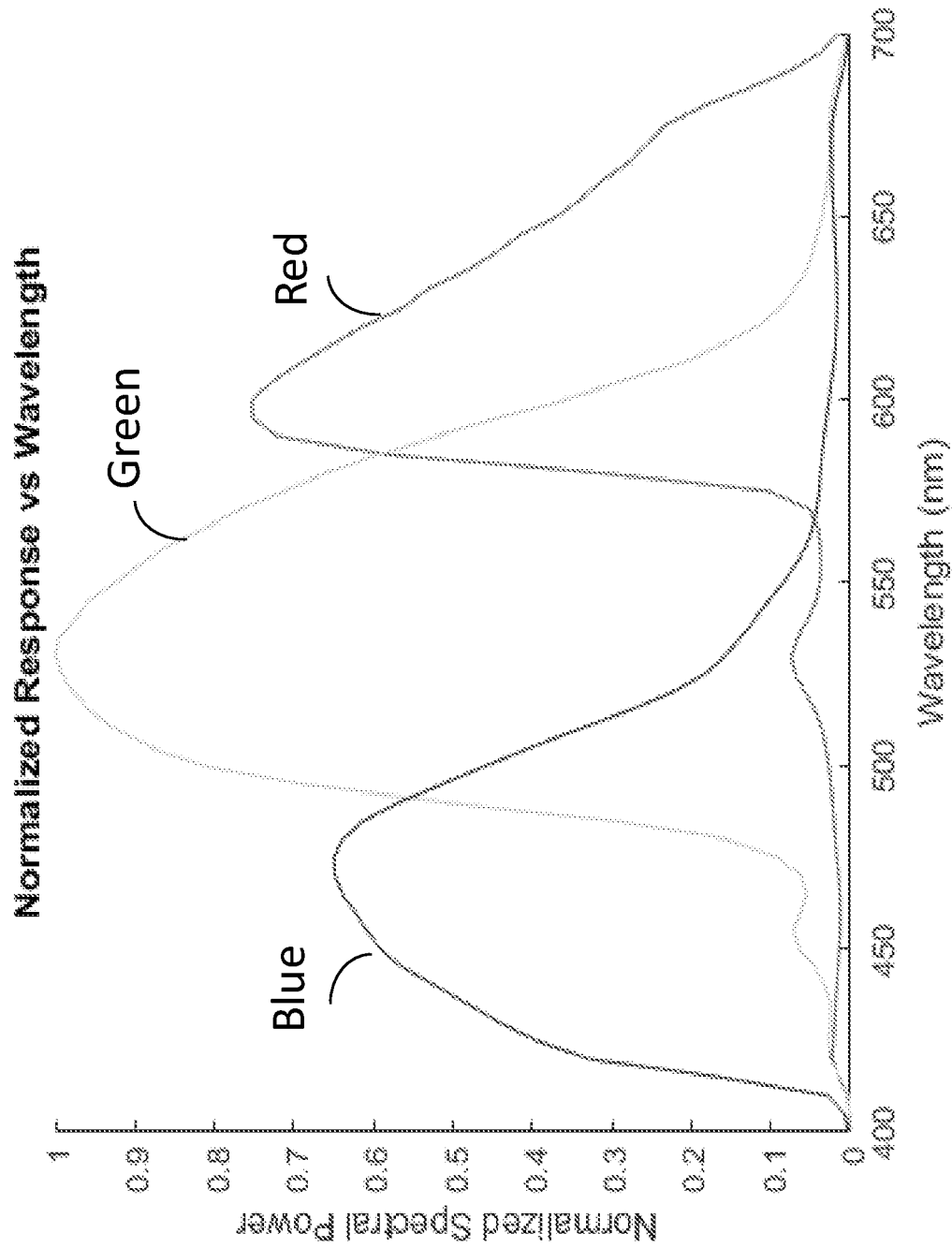
FIG. 1 shows an exemplary spectral sensitivity plot for a typical mobile camera.
Figure 2:
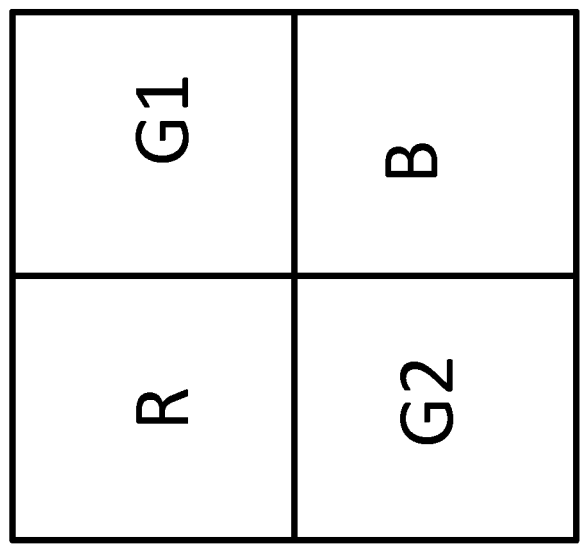
FIG. 2 shows a Bayer mosaic structure cell.

Image reconstruction methods and devices in accordance with the present disclosure may be applied to raw images on a per-pixel basis (unsaturated pixels). Such methods may be implemented as a pre-processing step on the raw image stream, possibly in an Image Signal Processing (ISP) or Digital Signal Processing (DSP) unit. The disclosed methods and devices may be applied to raw images with any type of color filter arrays (CFA), or for camera systems with unique sensors for the R, G, and B channels. Throughout this paper and without departing from the scope and spirit of the disclosure, embodiments of the invention are described using a Bayer mosaic structure "cell" as shown in FIG. 2. The Bayer filter is a very common RGB filter with one blue B, one red R and two greens G1, G2. For such a cell structure there are a total of $2^4=16$ possible saturation combinations ranging from no channels saturated to all four channels (G1 and G2 are treated separately) saturated. According to embodiments of the present disclosure, saturated pixels are identified based on raw signal values above a predetermined threshold), the problem is then divided into different saturation types: type I for only one channel saturated, type II for two channels saturated, type III for all three channels saturated.

Figure 3:
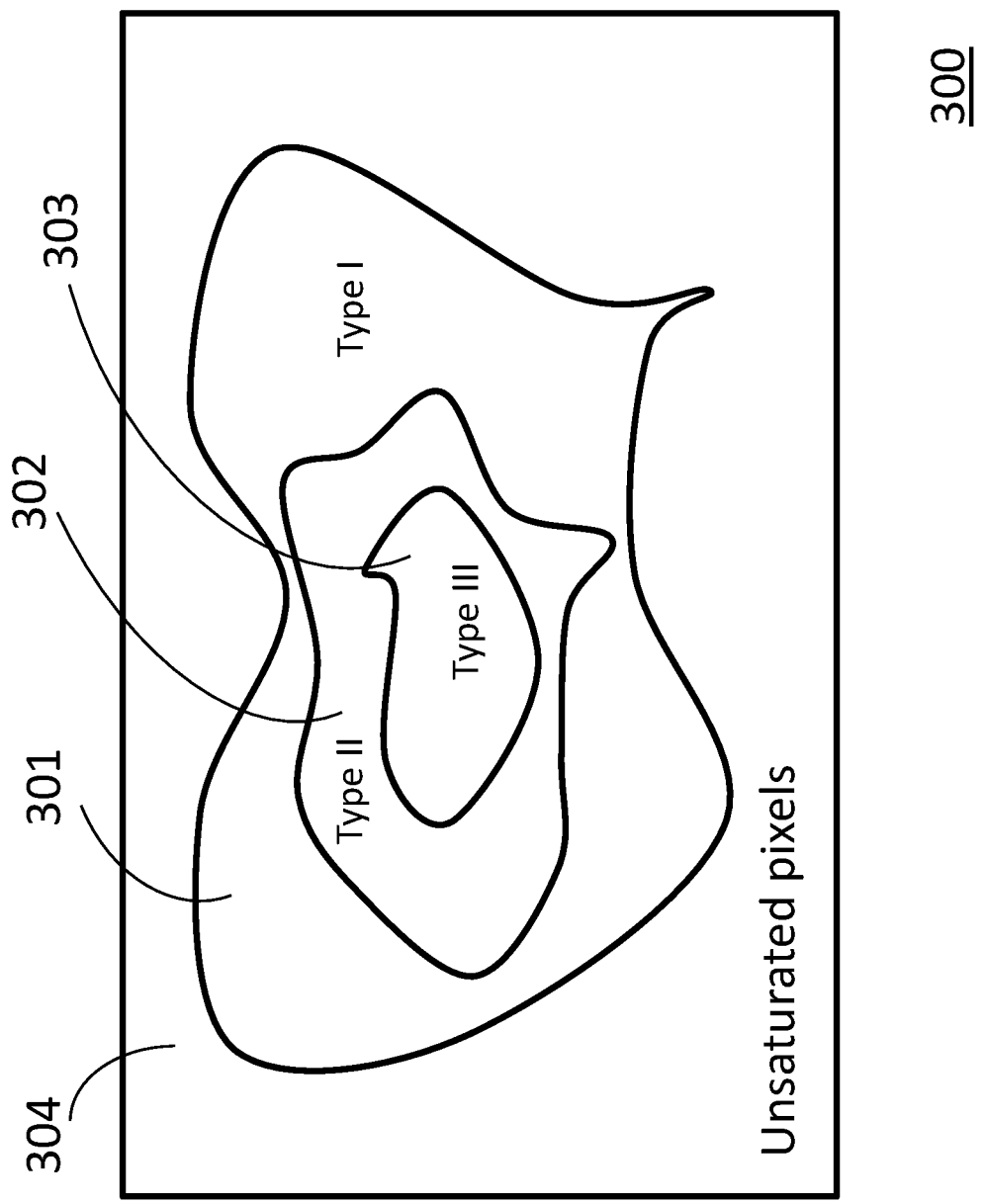
FIG. 3 shows an example image with type I, II, III saturated regions.

FIG. 3 shows an image (300) comprising regions (301, 302, 303) containing respectively type I, type II and type III saturated pixels. Region (304) of the image (300) represent a portion of the image (300) containing unsaturated pixels. As will be described more in detail later, and according to embodiments of the present disclosure, using the unsaturated pixels of the region (304), the saturated pixels within the region (301) are estimated first. Type II saturated pixels within the region (302) will then be estimated based on the estimation of the type I clipped pixels. At last, clipped pixels of the region (303) are estimated based on previous estimations. As such, the challenge is to have accurate estimation of type I saturated pixels as the other channel combinations (type I and type II, where more than one channel is saturated), will rely on these estimations.

In what follows, embodiments according to the present disclosure and addressing reconstruction of type I, type II and type III saturated channels in an image are described.

Type I Saturated Pixels

As described previously, channel estimates are first made in regions where only a single channel is clipped. From the standpoint of accuracy of reconstruction, these are the regions that have the most information still intact—and therefore the probability is much higher for correctly predicting the relative radiance of the clipped channel.

Figure 4:
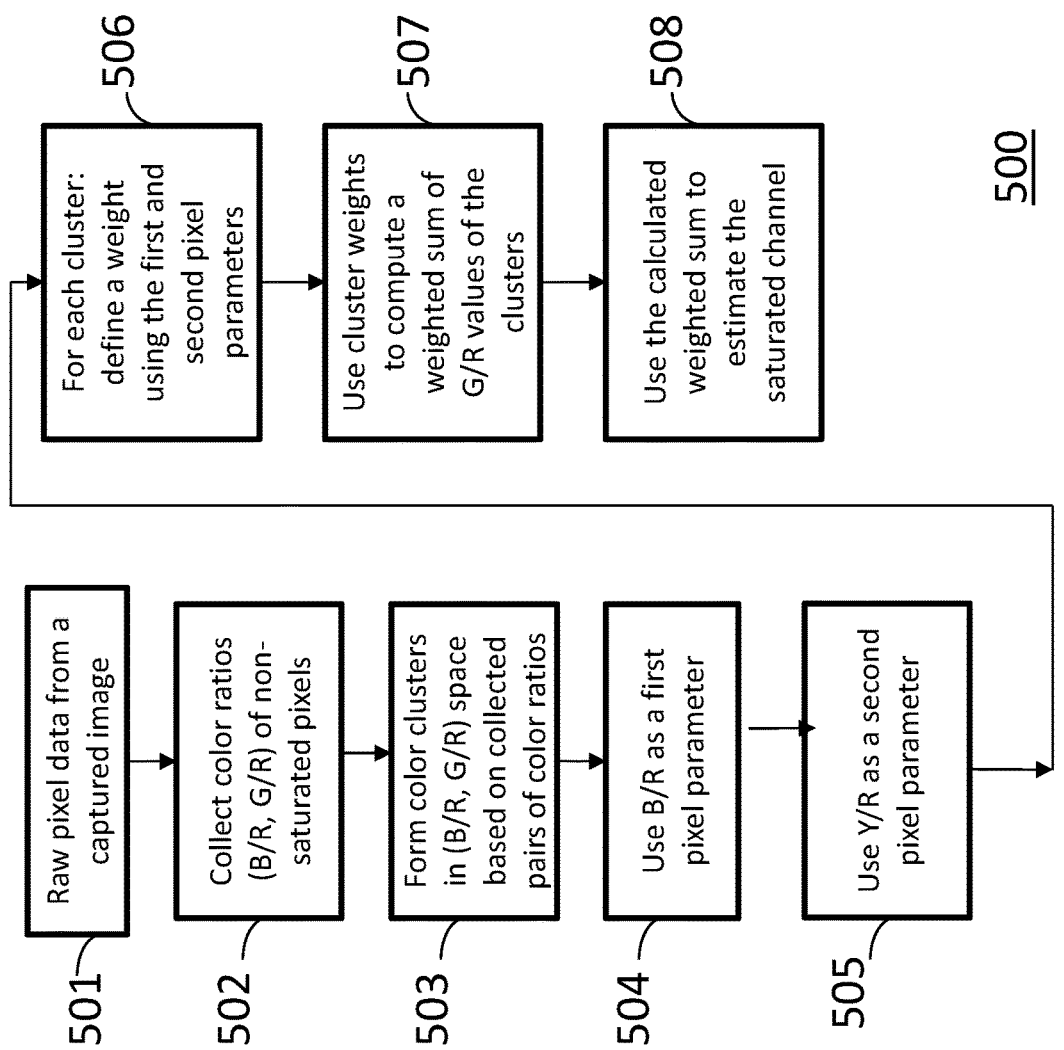
FIG. 4 shows a flow chart of an image reconstruction method according to an embodiment of the present disclosure.
Figure 5:
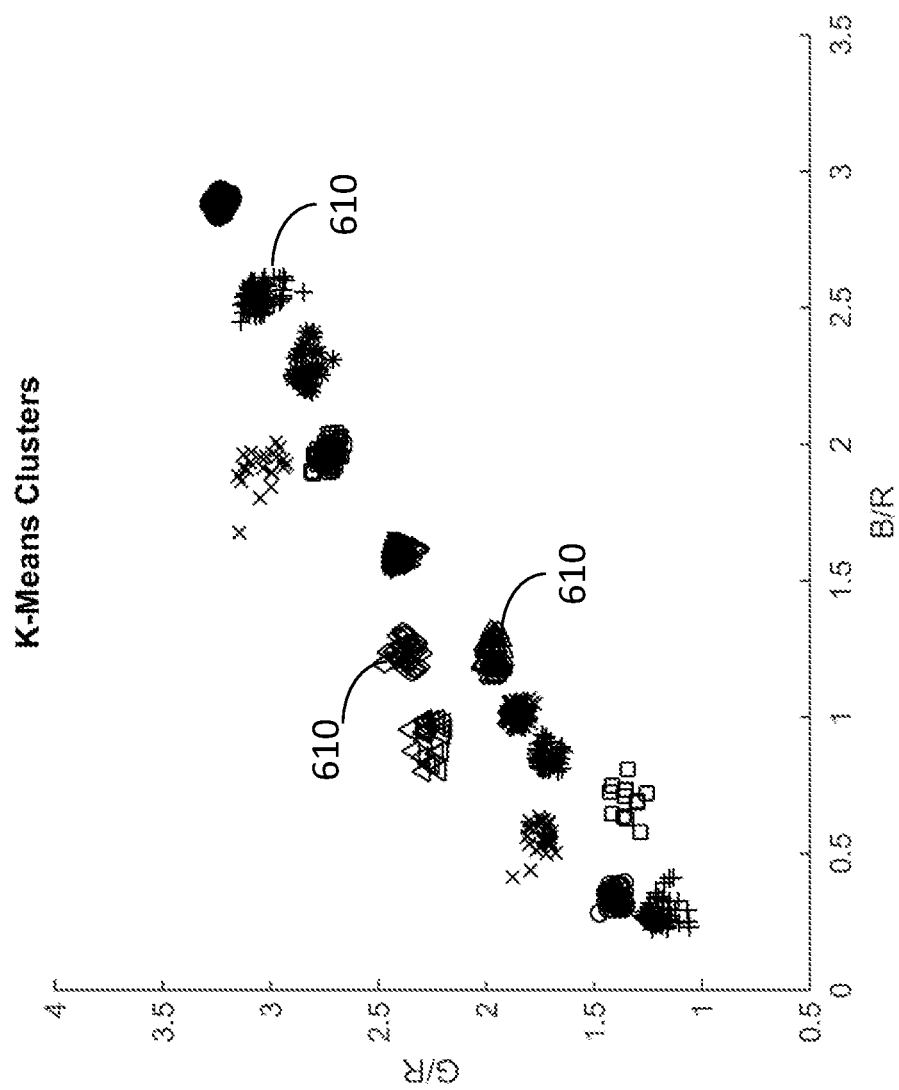
FIG. 5 shows an example of a scattered plot of clusters in a (B/R, G/R) space.

FIG. 4 shows a flow chart (500) representing various steps of a reconstruction algorithm of type I saturated pixels in accordance with an embodiment of the disclosure. Step (501) shows that an input to such algorithm is raw pixel data corresponding to a captured image. According to an embodiment of the present disclosure, a color filter array such as Bayer filter is used when capturing the image. The image includes a first region comprising first region pixels, wherein colors of the first region pixels have a first color channel that is saturated. As an example, a scenario where the G channel is saturated (R and B channels are not saturated) is considered. Referring back to FIG. 4, in a step (502), pairs of color ratios (e.g. B/R and G/R) of non-saturated pixels are collected. The color ratios are essentially (first and second) pixel parameters representing different color properties of pixels. In an example the first pixel parameter may be the ratio G/R of the green color channel values (first color channel values) and the red color channel values. Further in the example, the second pixel parameter may be the ratio B/R of the blue color channel values and the red color channel values. In general, the first pixel parameter may be the ratio of the color channel value of the saturated color channel and the color channel value of an unsaturated color channel. Likewise, the second pixel parameter may be the ratio of the color channel values of the two unsaturated color channels. Referring to FIGS. 4-5, and in a next step (503), clusters (610) are formed based on collected color ratios (B/R, G/R) to statistically separate unclipped pixels throughout the entire image. That is, the unsaturated pixels are clustered into color clusters based on the first pixel parameter and the second pixel parameter of the unsaturated pixels. According to an embodiment of the present disclosure, a k-means algorithm may be used to compute such color clusters. FIG. 5 shows an exemplary scattered plot of clusters in a (B/R, G/R) space for an example raw image. Each of the clusters shown in FIG. 5 has an associated mean (B/R, G/R) centroid. The centroid for each cluster is calculated based on (B/R, G/R) values of pixels of the cluster. In general, a cluster value of a given pixel parameter for a color cluster may be determined as the mean centroid (or mean value, or average) of the pixel parameter for that color cluster. Accordingly, a first cluster parameter for a given color cluster can be provided based on the first pixel parameter of the pixels of that color cluster (e.g., by using the mean centroid, etc., of the first pixel parameter for that color cluster). Analogous statements apply to the second pixel parameter and the third pixel parameter (defined below), respectively.

With further reference to FIG. 4, steps (504, 505) involves choosing, in addition to the first and second pixel parameters, a third pixel parameter, so that a combination of pixel parameters (e.g., of the second and third pixel parameters) is representative of unique properties of each cluster or pixel. By way of example and not of limitation, such properties may relate to color properties or physical distances between pair of pixels. In accordance with an embodiment of the disclosure the B/R ratio may be used as the second pixel parameter, as noted above. Referring to scatter plots of FIG. 5, it can be noticed that a pixel with a certain B/R value would have a multitude of valid possible G/R ratios. As such, and in order to represent uniquely each cluster, a third pixel parameter is required to properly map into the y-axis of the scatter plots. A ratio Y/R wherein Y is the luminance (luminance value) may be used as the third pixel parameter in accordance with some embodiments of the present disclosure. Alternatively, a spatial pixel location may be used as the third pixel parameter in some embodiments.

With reference to step (507) of FIG. 4, and referring back to equation (1) described previously, (an estimate of) the coefficient α(x, y) may be calculated using the following equation:

$$\alpha_{est} = \sum_{i=1}^{N_c} \alpha_i w_i \qquad (2)$$

wherein $w_i$ is a weighting coefficient (see step (506) of FIG. 4) corresponding to cluster i. The coefficient $\alpha_{est}$ may be a referred to as a weighted sum of the first cluster parameters of the clusters used in the reconstruction process. The weighting coefficient $w_i$ for a given pixel in the first region and a given color cluster i can be determined based on the second and third pixel parameters of the pixel in the first region and the second and third cluster parameters of the color cluster. For example, the weighting coefficient can be determined by:

$$w_i = \frac{1}{P} e^{-\frac{(\beta-\beta_i)^2}{2\Delta_\beta}} e^{-\frac{(Y/R-(Y/R)_i)^2}{2\Delta_Y}}$$

wherein $\alpha_i$ is the G/R ratio for cluster i (e.g., the first cluster parameter), and $\beta_i$ is the corresponding B/R ratio (e.g., the second cluster parameter). $\beta$ and Y/R are the B/R ratio (e.g., the second pixel parameter) and the luminance ratio (e.g., the third pixel parameter) of the clipped pixel respectively. $N_c$ is the number of clusters used in the reconstruction process (e.g., at least one cluster, or a plurality of clusters) and $(Y/R)_i$ represents the luminance ratio of the i-th cluster (e.g., the third cluster parameter). Referring to equation (3) above, and according to an embodiment of the disclosure, weighting coefficients $w_i$ may be determined by Gaussian functions. Other embodiments in accordance with the present disclosure may be envisaged wherein, depending on the image details, other functions with more or less computational complexity may be used. As a further example, a Lorentzian function may be used. Parameters $\Delta_\beta$ and $\Delta_\gamma$ represent spreads of the Gaussian functions in equation (3) and essentially determine the overlap range between the pixel's parameters and those of clusters. In other words, such parameters indicate the degree of correlation between saturated pixels and corresponding clusters. P is a normalization constant to ensure the sum of the weights is equal to unity. Referring to step (508) of the flowchart (500) of FIG. 4, once the coefficient $\alpha_{est}$ is estimated, equation (1) as presented previously, may be used to estimate the saturated green channel $G_{est}(x,y)$ located at coordinate (x, y) (e.g., using $a_{est}$ for a in equation (1)). That is, an estimate of the saturated color channel value (e.g., first color channel estimate) for a given pixel in the first region may be obtained based on the weighted sum of the first cluster parameter and color information associated with (at least) one unsaturated color channel of the pixel.

Type II Saturated Pixels

According to further embodiments of the present disclosure, once type I saturated pixel have been estimated, that information is utilized to populate the regions with two channels saturated (type II). This is justified in nearly all cases, as gradients in intensity will generally produce a single channel saturation first, followed by two channel saturation in adjacent regions. In other words, type I reconstructions will strongly influence locally corresponding type II estimations. In view of this, and in order to determine the pixels that reside at the boundary of type I/type II regions (but exist in the type I regions), a morphological operation shown below is performed in accordance with embodiments of the present disclosure:

$$m_{I-II} = [\text{dilate}(m_{II}) - m_{II}] \text{ AND } m_I \quad (4)$$

wherein $m_I$ and $m_{II}$ are masks representing type I and II pixels, and $m_{I-II}$ is the mask for the boundary pixels. Function dilate( ) refers to a morphological binary dilate operation. Note this could also be achieved by edge detection algorithms and finding the regions of these boundaries that intersect type I pixels. FIGS. 6A-6C show the process of defining the type I/type II boundary region. Regions (910, 911) correspond to the regions of an image having (type I, type II) saturated pixels respectively. Referring to FIG. 6A, and performing a dilate($m_{II}$) operation, a boundary region (912) is generated. This is followed by subtracting the type II region mask to generate the image shown in FIG. 6B. Lastly, performing a binary AND operation with region (910) will result in the boundary region (912). As described previously, the resulting boundary region (912) may now be used to estimate type II pixels. The person skilled in art will appreciate that the subtraction operation in equation (4) may be optional and according to further embodiments of the present disclosure, equation (4) may be replaced by equation (4') below:

$$m_{I-II} = \text{dilate}(m_{II}) \text{ AND } m_I \quad (4')$$

In accordance with embodiments of the present disclosure, and similar to type I estimation, a fourth and a fifth pixel parameter are used in the process of estimating type II clipped channels (e.g., in addition to the first and second pixel parameters). Continuing with the same scenario as considered above and where only the R channel is unsaturated (channels G and B are saturated), the fourth pixel parameter may be chosen as the R color channel value. In accordance with some embodiments of the present disclosure, the fifth pixel parameter may be defined based on the spatial coordinates of the type II pixel under consideration. Again, similar to type I channel estimation, weighting coefficients are computed using a function that is defined based on a comparison of the fourth and fifth pixel parameters of the clipped pixel under question with corresponding fourth and fifth pixel parameters of the type I/type II boundary region pixels. In order to estimate the B channel, a coefficient $\gamma_{est}$ may be defined as follows and based on a weighted sum of B/R ratios (e.g., second pixel parameters) of pixels of the boundary region:

$$\gamma_{est} = \sum_{j=1}^{N_1} \gamma_j w_j \quad (2')$$

The coefficient $\gamma_{est}$ may be a referred to as a weighted sum of the second pixel parameters of the pixels in the boundary region that are used in the reconstruction process. The weighting coefficient $w_i$ for a given type II pixel under consideration and a given pixel j in the boundary region (boundary pixel) can be determined based on the fourth and fifth pixel parameters of the type II pixel under consideration and the fourth and fifth pixel parameters of the pixel in the boundary region. For example, the weighting coefficients $w_j$ can be this time calculated according to the following equation:

$$w_j = \frac{1}{P_1} e^{-\frac{(R-R_j)^2}{2\Delta_R}} e^{-\frac{(x-x_j)^2+(y-y_j)^2}{2\Delta_{xy}}} \quad (3')$$

wherein index j corresponds to boundary pixel j and $\gamma_j$ is the corresponding B/R ratio (e.g., second pixel parameter). $R_j$, $x_j$, and $y_j$ are red channel (e.g., fourth pixel parameter) and spatial coordinates (e.g. fifth pixel parameter) of the boundary pixel j and R, x, and y are corresponding parameters (e.g., fourth and fifth pixel parameters) of the saturated pixel being estimated. $N_1$ is the number of pixels being used in the reconstruction process, and lying within the type I/II boundary region. Parameters $\Delta_R$ and $\Delta_{xy}$ represent spreads of corresponding Gaussian functions as described in equation (3') above. According to further embodiments of the present disclosure, functions other than Gaussian may be used without departing from the scope and spirit of the invention. Parameter $P_1$ is a normalizing factor. According to an embodiment of the present disclosure, the G/R color channel of the second region pixels may be estimated using a similar method described with regards to type I saturated pixels. In accordance to an embodiment of the present disclosure and referring back to equation (2), the saturated G channels of the type II region can now be estimated in a similar way as what was described with regards to type I saturated pixels. However, this time the weighted sum is defined based on previously-estimated values of G/R ratios (e.g., first pixel parameters) of the boundary pixels, as those pixels are of type I with their G channel saturated. Once the coefficients $\alpha_{est}$ and $\gamma_{est}$ are calculated, the G channel can be estimated according to equation (1) and the B channel may be estimated according to the following equation:

$$B_{est}(x,y)=\gamma(x,y)R(x,y) \quad (1')$$

Type III Saturated Pixels

In accordance with embodiments of the present disclosure, in order to estimate type III saturated pixels, the same mechanism described with regards to type II saturated pixel estimation may be used. In other words, a mask representing pixels at the II-III interface may be defined similarly to what described above with regards to type II saturated pixel reconstruction. In order to populate the saturated channels, the same weighted average can be used, this time with k in reference to the II-III interface pixels (see equations (2" a-b) below). As all three channels are saturated, and as an example, the R channel (although saturated) will be used as a baseline and the other two channels B and G will be estimated in a similar way as the method described with regards to type II pixels. Due to lack of information and the fact that all three channels are saturated, a single pixel parameter (instead of two) may be used to compute weighting factors. The one parameter may be defined based on spatial location, and that would be compared to the locations of the interface pixels as before. The weighting factors may be defined according to the following equation:

$$w_k = \frac{1}{P_2} e^{-\frac{(x-x_k)^2+(y-y_k)^2}{2\Delta_{xy}}} \quad (3'')$$

wherein (x, y) is a spatial location (e.g., fifth pixel parameter) of the pixel under question and $(x_k, y_k)$ is the spatial location of the pixel k in the type II/III boundary region. The coefficient $\alpha_{est}$ is then obtained using equation (2"a) below wherein the coefficients $\alpha_k$ are G/R ratios (e.g., first pixel parameters) of type II/III boundary pixels calculated based on estimated values of the G channels (the G channel is initially saturated in the type II region including type II/III boundary region). Similarly, the coefficient $\gamma_{est}$ is obtained using equation (2"b) below wherein the coefficients $\gamma_k$ are B/R ratios (e.g., second pixel parameters) of type II/III boundary pixels calculated based on estimated values of the B channels (the B channel is also initially saturated in the type II region including type II/III boundary region). $N_2$ is the number of pixels in the type II/III boundary region used for the reconstruction.

$$\alpha_{est} = \sum_{i=1}^{N_2} \alpha_k w_k \quad (2''a)$$

$$\gamma_{est} = \sum_{j=1}^{N_2} \gamma_k w_k \quad (2''b)$$

At a final step, the G and B channels are then estimated using equations (1) and (1') respectively and similar to the case of type II saturated pixels.

According to some embodiments of the present disclosure, type III pixels may be forced to a chosen white point of the image, but that may result in contours or tone-scale inversions in some cases. Considering R as the least sensitive channel, the R channel can be used as a baseline and then G and B channels are boosted as follows so that when white balancing is applied in the processing pipeline the result is still white:

$$G_{est} = R\frac{w_g}{w_r}, B_{est} = R\frac{w_g}{w_b}$$

where $w_g$, $w_b$, and $w_r$ are coefficient to maintain the R channel as a baseline and to scale the R and B channel accordingly.

Alternative Method of Type I, II and III Saturated Pixels Estimation

According to further embodiments of the present disclosure, type I saturated pixels may be estimated using the following steps:

a) Identify boundary regions for type I using one of the equations (5) or (5') below:

$$m_I=[\text{dilate}(m)-m)] \text{ AND } n \quad (5)$$

$$m_I=\text{dilate}(m) \text{ AND } n \quad (5')$$

wherein m refers to the mask corresponding to the type I pixels (only one channel saturated) and n is a mask corresponding to non-saturated pixels in the image.

b) Identity pixels within one or more boundary regions using for example a watershed method c) Pair one or more saturated regions with corresponding one or more boundary regions. For one or more pairs:
I. For one or more pixels in the boundary region, compute a ratio between the saturated color channel and the non-saturated color channels
II. For one or more pixels in the saturated region, the saturated color channel is replaced with a value obtained by multiplying the non-saturated color channels by a ratio, wherein:
i. The ratio can be the average of all the ratios in the corresponding border region, or it can be weighted according to the distance from the pixel to each of the pixels in the border region
ii. The ratio can be the average of the ratio of the two un-saturated color channels, possibly using a weighted average with a higher weight on the pixel with the more reliable value (typically the higher value).

In other words, an estimate of the saturated color channel is obtained by multiplying the one or more of the non-saturated color channels with the second ratio. The saturated color channel may then be replaced by the estimate for the saturated color channel.

Steps above may be repeated to estimate type II and type III saturated pixel channels.

Hardware Devices

Figure 7B:
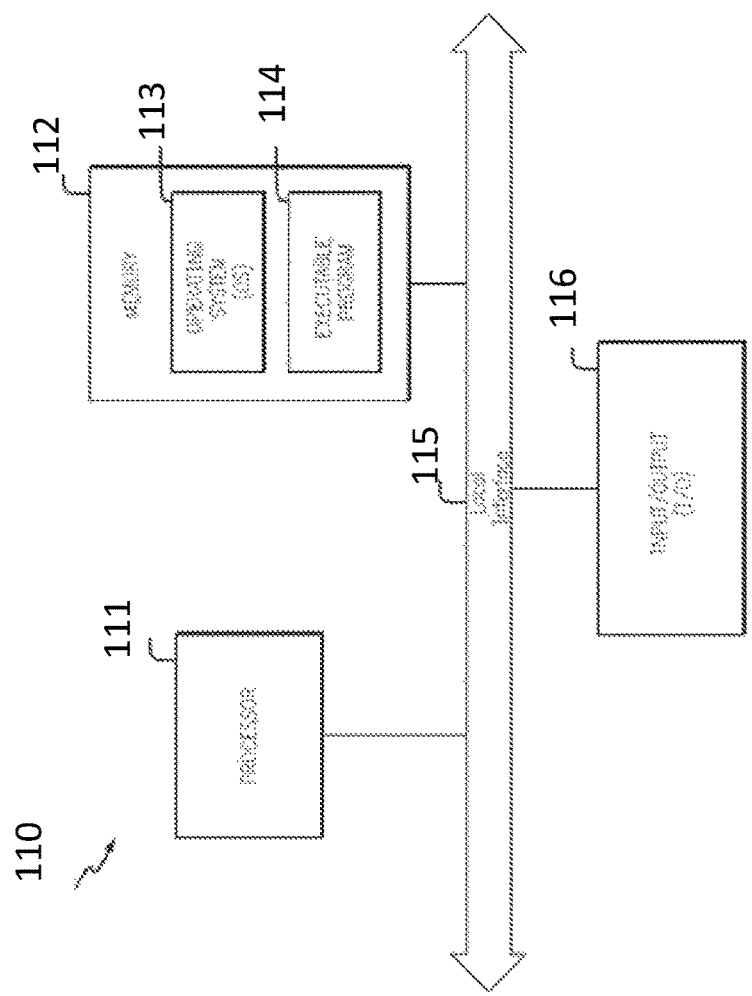
FIG. 7B shows an electronic image processing circuit according to embodiments of the present disclosure.
Figure 7A:
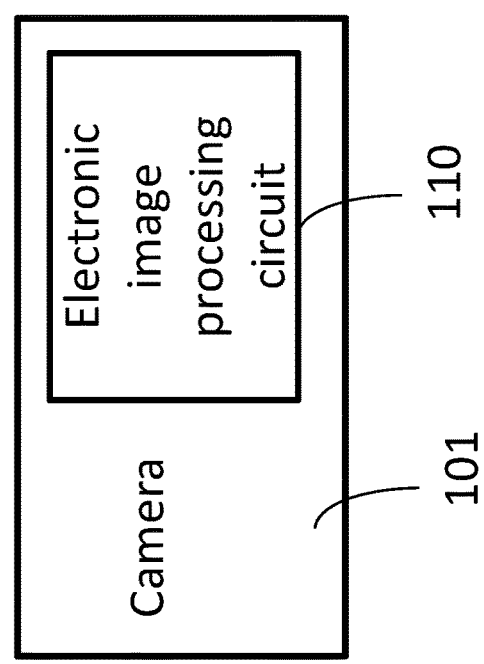
FIG. 7A shows an image processing device, e.g. a camera in accordance with an embodiment of the present disclosure.

FIG. 7A shows an image processing device, e.g. a camera (101) comprising an electronic image processing circuit (110). According to embodiments of the present disclosure, the electronic image processing circuit (110) may implement the image reconstruction methods described throughout the disclosure. As shown in FIG. 7B, the electronic image processing circuit (110) may comprise a processor (111), a memory bank (112), a local interface bus (115) and one or more Input/Output devices (116). The processor may execute one or more instructions related to the implementation of, for example, FIGS. 4 and 6A-6C, and as provided by the Operating System (113) based on some executable program (114) stored in the memory (112). These instructions are carried to the processor (111) via the local interface (115) and as dictated by some data interface protocol specific to the local interface and the processor (111). It should be noted that the local interface (115) is a symbolic representation of several elements such as controllers, buffers (caches), drivers, repeaters and receivers that are generally directed at providing address, control, and/or data connections between multiple elements of a processor based system. In some embodiments the processor (111) may be fitted with some local memory (cache) where it can store some of the instructions to be performed for some added execution speed. Execution of the instructions by the processor may require usage of some input/output device (116), such as inputting data from a file stored on a hard disk, inputting commands from a keyboard, inputting data and/or commands from a touchscreen, outputting data to a display, or outputting data to a USB flash drive. In some embodiments, the operating system (113) facilitates these tasks by being the central element to gathering the various data and instructions required for the execution of the program and provide these to the microprocessor. control of the processor (111), although the basic architecture of the electronic image processing circuit (110) will remain the same as depicted in FIG. 7B. In some embodiments a plurality of processors may be used in a parallel configuration for added execution speed. In such a case, the executable program may be specifically tailored to a parallel execution. Also, in some embodiments the processor (111) may execute part of the implementation of the image reconstruction methods as disclosed, or part of the implementation of FIGS. 4 and 6, and some other part may be implemented using dedicated hardware/firmware placed at an Input/Output location accessible by the electronic circuit (110) via local interface (115). The electronic image processing circuit (110) may include a plurality of executable programs (114), wherein each may run independently or in combination with one another.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), a field programmable logic array (FPGA), a graphic processing unit (GPU) or a general purpose GPU).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

ENUMERATED EXAMPLE EMBODIMENTS

Enumerated example embodiments ("EEEs") of the present invention have been described above in relation to methods and devices for recovering saturated pixel values in raw pixel data. Thus, an embodiment of the present invention may relate to one or more of the examples, enumerated below:

EEE1

An image reconstruction method comprising
 (a) providing raw pixel data from an image captured using a color filter array or separate color sensors, wherein the image has a first region comprising first region pixels, and wherein colors of the first region pixels have a first color channel being saturated;
 (b) choosing a first pixel parameter, a second pixel parameter, and a third pixel parameter wherein
  the first pixel parameter represents a first pixel property of image pixels;
  the second pixel parameter represents a second pixel property of the image pixels; and
  the third pixel parameter represents a third pixel property of the image pixels;
 (c) dividing unsaturated pixels of the image into a plurality of color clusters based on the first pixel parameters and the second pixel parameters of the unsaturated pixels;
 (d) for at least one color cluster of the plurality of color clusters:
  (d1) providing a first cluster parameter based on the first pixel parameters of the pixels of the color cluster;
  (d2) providing a second cluster parameter based on the second pixel parameters of the pixels of the color cluster; and
  (d3) providing a third cluster parameter based on the third pixel parameters of the pixels of the color cluster;
 (e) for one or more pixels of the first region:
  (e1) in correspondence with a color cluster of the plurality of color clusters: providing a first weighting coefficient based on the second and the third pixel parameters of the one or more pixels of the first region and the second and the third cluster parameters of the color cluster of the plurality of color clusters;

(e2) obtaining a weighted sum of the first cluster parameters using the first weighting coefficients;

(e3) obtaining a first color channel estimate of the one or more pixels of the first region using a combination of the weighted sum of the first cluster parameters and a color information associated with at least one unsaturated color channel of the one or more pixels of the first region.

EEE2

The image reconstruction method as recited in enumerated example embodiment 1, wherein the image further comprises a second region adjacent to the first region and comprising second region pixels, wherein the first color channel and a second color channel of colors of the second region pixels are saturated, the method further comprising (f) generating a first boundary region within the first region and bordering the second region;

(g) choosing a fourth pixel parameter and a fifth pixel parameter, wherein:
the fourth pixel parameter represents a fourth pixel property of the image pixels; and
the fifth pixel parameter represents a fifth pixel property of the image pixels;
and (h) for one or more pixels of the second region:
(h1) in correspondence with a pixel of the first boundary region: providing a second weighting coefficient based on the fourth and the fifth pixel parameters of the one or more pixels of the second region and the fourth and the fifth pixel parameters of the pixel of the first boundary region;
(h2) obtaining a weighted sum of the second pixel parameters of the pixels of the first boundary region using the second weighting coefficients;
(h3) obtaining a weighted sum of the first pixel parameters of the pixels of the first boundary region using the second weighting coefficients;
(h4) obtaining a second color channel estimate of the one or more pixels of the second region using a combination of the weighted sum of the second pixel parameters of the pixels of the first boundary region and a color information associated with at least one unsaturated color channel corresponding to the one or more pixels of the second region; and
(h5) obtaining a first color channel estimate of the one or more pixels of the second region using a combination of the weighted sum of the first pixel parameters of the pixels of the first boundary region and the color information associated with the at least one unsaturated color channel corresponding to the one or more pixels of the second region.

EEE3

The image reconstruction method as recited in enumerated example embodiment 2, wherein the first pixel parameters of the pixels of the boundary region are calculated based on first color channel estimates of the pixels of the first boundary region.

EEE4

The image reconstruction method as recited in enumerated example embodiment 3, wherein the image further comprises a third region adjacent to the second region and comprising third region pixels, wherein the first color channel, the second color channel and a third color channel of colors of the third region pixels are saturated, the method further comprising:

(i) generating a second boundary region within the second region and bordering the third region; and (j) for one or more pixels of the third region:
(j1) in correspondence with a pixel of the second boundary region: providing a third weighting coefficient based on the fifth pixel parameter of the one or more pixels of the third region and the fifth pixel parameter of the pixel of the second boundary region;
(j2) obtaining a weighted sum of the first pixel parameters of the pixels of the second boundary region using the third weighting coefficients;
(j3) obtaining a weighted sum of the second pixel parameters of the pixels of the second boundary region using the third weighting coefficients;
(j4) estimating the first color channel of the pixel of the third region, using a combination of the weighted sum of the first pixel parameters of the pixels of the second boundary region and a color information associated with the third color channel of the one or more pixels of the third region; and
(j5) estimating the second color channel of the pixel of the third region, using a combination of the weighted sum of the second pixel parameters of the pixels of the second boundary region and the color information associated with the third color channel of the one or more pixels of the third region.

EEE5

The image reconstruction method as recited in enumerated example embodiment 4, wherein the first pixel parameters of the pixels of the second boundary region are calculated using the first color channel estimates of the pixels of the second boundary region, and wherein the second pixel parameters of the pixels of the second boundary region are calculated based on the second color channel estimates of the pixels of the second boundary region.

EEE6

The image reconstruction method as recited in one of enumerated example embodiments 1 through 5, wherein the first pixel parameter is defined based on the first color channel.

EEE7

The image reconstruction method as recited in one of enumerated example embodiments 1 through 6, wherein the color filter array follows a Bayer pattern.

EEE8

The image reconstruction method as recited in one of enumerated example embodiments 1 through 7, wherein the step of dividing unsaturated pixels of the image into a plurality of color clusters is performed using k-means algorithm.

EEE9

The image reconstruction method as recited in one of enumerated example embodiments 4 through 8, wherein each of the first, the second and the third weighting coefficients is computed using one of a Gaussian or a Lorentzian function.

EEE10

The image reconstruction method as recited in one of enumerated example embodiments 4 through 9, wherein:
the first pixel parameter is a ratio of a green color channel to a red color channel;
the second pixel parameter is a ratio of a blue color channel to the red color channel;
the third pixel parameter is a ratio of a luminance to the red color channel or corresponds to spatial pixel location;
the fourth pixel parameter is a red color channel value; and
fifth pixel parameter is related to a pixel spatial location.

EEE11

The image reconstruction method as recited in one of enumerated example embodiments 4 through 10, wherein the first color channel is a green channel, the second color channel is a blue channel and the third color channel is a red channel.

EEE12

The image reconstruction method as recited in one of enumerated example embodiments 2 through 11, wherein the step of generating the first boundary region comprises:
providing a first mask representing the pixels of the first region;
providing a second mask representing the pixels of the second region;
applying a morphological dilate operation to the second mask to generate a third mask corresponding to dilated second region pixels;
subtract the second mask from the third mask to generate a fourth mask; and
apply a binary AND operation to the first mask and either of the third mask or the fourth mask to generate a fifth mask corresponding to the first boundary region.

EEE13

The image reconstruction method as recited in one of enumerated example embodiments 2 through 12, wherein:
step d1 is performed using an average of the first pixel parameters of pixels of a corresponding cluster;
step d2 is performed using an average of the second pixel parameters of pixels of the corresponding cluster; and
step d3 is performed using an average of the third pixel parameters of pixels of the corresponding cluster.

EEE14

The image reconstruction method as recited in one of enumerated example embodiments 1 through 13, wherein the separate color sensors comprise R, G, B sensors.

EEE15

An image reconstruction method comprising:
(a) providing raw pixel data from an image captured using a color filter array, wherein the image has a saturated region comprising saturated region pixels, and wherein colors of the saturated region pixels have a saturated color channel;
(b) identifying a boundary region using one of equations A) $m_f=[\text{dilate}(m)+m)]$ AND n, or B) $m_f=\text{dilate}(m)$ AND n, wherein:
m is a first mask corresponding to pixels of the first region;
n is second mask corresponding to non-saturated pixels in the image;
$m_I$ is a third mask corresponding to the boundary region; and
dilate( ) is a morphological dilating function.
(c) for one or more pixels of the boundary region, providing a first ratio between the saturated color channel of the one or more pixels of the boundary region and a non-saturated color channels of the image;
(d) for one or more pixels of the saturated region, obtaining an estimate of the saturated color channel (e.g., for replacing the saturated color channel) by multiplying one or more of the non-saturated color channels by a second ratio wherein, the second ratio is one of:
(d1) an average of all the first ratios; or
(d2) an average of ratios of two non-saturated color channels.

EEE16

The image reconstruction method as recited in enumerated example embodiment 15, the average of all the weighted ratios is weighted according to distances between the pixel of the saturated region pixels of the boundary region pixels.

EEE17

An image processing device comprising an image processing circuit configured to implement the image reconstruction method as recited in one of enumerated example embodiments 1 through 16.

EEE18

Computer program product, having instructions which, when executed by a computing device or system, causes said computing device or system to perform the method as recited in any of the enumerated example embodiments 1 through 16.

What is claimed is:
1. An image reconstruction method comprising:
(a) providing raw pixel data from an image captured using a color filter array or separate color sensors, wherein the image has a first region comprising first region pixels, and wherein colors of the first region pixels have a first color channel being saturated;
(b) choosing a first pixel parameter, a second pixel parameter, and a third pixel parameter wherein:
the first pixel parameter represents a first pixel property of image pixels;
the second pixel parameter represents a second pixel property of the image pixels; and
the third pixel parameter represents a third pixel property of the image pixels;
(c) dividing unsaturated pixels of the image into a plurality of color clusters based on the first pixel parameters and the second pixel parameters of the unsaturated pixels;

(d) for at least one color cluster of the plurality of color clusters:
- (d1) providing a first cluster parameter based on the first pixel parameters of the pixels of the color cluster;
- (d2) providing a second cluster parameter based on the second pixel parameters of the pixels of the color cluster; and
- (d3) providing a third cluster parameter based on the third pixel parameters of the pixels of the color cluster;

(e) for one or more pixels of the first region:
- (e1) for each of the at least one color cluster of the plurality of color clusters, in correspondence with the respective color cluster: providing a first weighting coefficient based on the second and the third pixel parameters of the one or more pixels of the first region and the second and the third cluster parameters of the respective color cluster;
- (e2) obtaining a weighted sum of the first cluster parameters using the first weighting coefficients;
- (e3) obtaining a first color channel estimate of the one or more pixels of the first region using a combination of the weighted sum of the first cluster parameters and color information associated with at least one unsaturated color channel of the one or more pixels of the first region;

wherein the third pixel parameter relates to physical pixel locations of pixels.

2. The image reconstruction method of claim 1, wherein the first and second pixel parameters are different from each other and relate to color or luminance properties of pixels; and/or
wherein the third pixel parameter is different from the first and second pixel parameters.

3. The image reconstruction method of claim 1, wherein the first pixel parameter is a first ratio of color channel values and the second pixel parameters is a second ratio of color channel values that is different from the first ratio.

4. The image reconstruction method according to claim 1, wherein the first pixel parameter is defined based on the first color channel.

5. The image reconstruction method according to claim 1, wherein the color filter array follows a Bayer pattern.

6. The image reconstruction method according to claim 1, wherein the step of dividing unsaturated pixels of the image into a plurality of color clusters is performed using k-means algorithm.

7. The image reconstruction method according to claim 1, wherein the separate color sensors comprise R, G, B sensors.

8. An image processing device comprising an image processing circuit configured to implement the image reconstruction method according to claim 1.

* * * * *